INVENTOR
Jacob Rabinow

BY Joseph A. Genovese & Max L. Libman
ATTORNEYS

INVENTOR
Jacob Rabinow
BY Joseph A. Genovese & Max L. Libman
ATTORNEYS

INVENTOR
Jacob Rabinow
BY Joseph A. Genovese & Max L. Libman
ATTORNEYS

United States Patent Office 3,264,469

Patented August 2, 1966

3,264,469

READING MACHINE WITH LARGE TOLERANCE TO ACCOMMODATE PRINT MISREGISTRATION

Jacob Rabinow, Bethesda, Md., assignor, by mesne assignments, to Control Data Corporation, Minneapolis, Minn., a corporation of Minnesota Filed Dec. 31, 1963, Ser. No. 334,762
9 Claims. (Cl. 340—146.3)

This invention relates to optical reading machines, and particularly to improving the useful output rates of such machines.

The art of identifying machine-printed and/or hand-printed characters by machine has progressed to the point where several machine classifications are recognized by authorities in this field. For example, there are area correlation (by optical or electronic masks) machines, curve tracing machines, feature and/or stroke analysis machines, and others. Within all of the classifications, a number of component variations are found. For example, an area correlation machine may use a mechanical disc scanner, a cathode ray tube scanner, a row of photocells, etc., to extract information from the image of an unknown character and its background area. Another example of possible machine variations within a classification is found in the decision sections of the machines. Regardless of the type of machine, an absolute decision (with or without a threshold) or a best match decision (e.g. as in the Rabinow Patent No. 2,933,246) can be used. Notwithstanding these and numerous other options available to the designer, at least two major problems remain in all prior reading machines of which I am aware. The first is "finding" the character image, and the second is the inordinate complexity and high cost of the machines.

Considering the first problem, i.e. "finding" the character image, it is perfectly understandable that before an unknown character can be identified, its entire image must be presented to the examination device of the reading machine to enable the character-defining information to be extracted from the unknown character and its background. This is true regardless of the nature of the examination device, i.e. whether it is technically considered a scanner or a full-area examiner, such as a mosaic of photocells or an optical mask. Registry difficulties are often thought of as "vertical" registry problems because character images are generally horizontally moved with respect to the scanner (or the equivalent) and it is the "vertical" dimension which is so difficult to cope with. For this reason, I shall use the term "vertical registration" herein.

Vertical registration difficulties are onerous. I have seen optical character reading machines having scanners, data processor circuitry and decision circuitry capable of identifying characters at rates of seven to ten thousand per second. Yet, owing primarily to vertical registration problems, the useful output rates of these machines were only of the order of 100 to 250 characters per second. There have been a number of steps taken to partially cope with this. One was to specify that printing for machine reading be held to exceeding exacting tolerances. Since this excluded hand printing and meant a high order of adjustment of printers, typewriters, etc., and there are so many now in use, this requirement is not generally acceptable. Another step that has been taken in the past deals with the method of presenting the character images to the scanner of the reading machine. For example, the Rabinow et al. Patent No. 3,104,369 discloses a high speed optical reading machine whose useful output reading rate is high owing in part to the paper mover used therewith. That paper mover is disclosed in the Fischer Patent No. 3,069,494. However, the Fischer invention deals with the problem of identifying characters that are formed in lines on a sheet such as a type-written sheet, a printed page, etc. It does not overcome the problem of vertical misregistry of a character within a line. Furthermore, the difficulty of registering the first character of the first line on the page with the scanner still existed. At best, the Fischer patent discloses an invention by which a fraction of the total problem is alleviated but not fully solved.

In the same Rabinow et al. patent a further step is disclosed. The machine uses a short-term temporary storage register which is considerably taller than the characters that are to be identified. After loading the register with character-defining data, the data in the register is shifted electronically (and therefore quite fast) to a predetermined position within the register so that the register can be interrogated at a specific place for temporarily stored data on which a character-identity decision can be made. This expedient represented a large step toward overcoming the vertical registration problem but, unfortunately, it introduced other, new problems, a few of which are mentioned below.

Initially, it is difficult to ascertain when the character-defining data has reached the predetermined position in the register, secondly, data handling in the register is time consuming, and thirdly, the large register is expensive. To overcome some of the newly introduced problems, the invention in the Holt Patent No. 3,104,371 discloses a number of means and methods of shifting the temporarily stored information in the register to a predetermined position. Other patentees, for example, Steinbuck et al. in Patent No. 3,069,079, suggests that the data may be shifted in spirals and/or meanders until the data coincides with the various coincidence circuits. All of these solutions to vertical registration problems and counter-problems slow the machine in the sense that the effective output rate is reduced; they increase cost and complexity, and reduce reliability of the machine.

It is obviously not possible to discuss all of the methods and means which have been resorted to in endeavoring to overcome the vertical registration problem. The problem has been recognized for many years, for example, attention is directed to the Rabinow Patent No. 2,795,705 which was filed in 1952 and which discloses plural, slightly displaced separate masks for each of the unknown characters that the machine is designed to identify. In principle, this is somewhat similar to later methods which multiply the number of character standards (e.g. correlation devices) for each unknown character and use them in parallel, the thinking being that if an unknown character image is slightly high or low, it can be identified by one of the plurality of correlation circuits for that character. The system disclosed in the Rabinow Patent No. 2,795,705, obviously reduces the effective, useful output rate of the machine, while the electronic plural-correlation circuit approach greatly increases complexity and introduces its own set of problems just like the problems introduced by vertical enlargement of the temporary-storage register described above.

An object of my invention is to provide a unique solution to the vertical registration problem in the reading machine by simple and economical means and in a manner such that enormous vertical misregistry (far greater than ordinarily experienced) can be tolerated. Simplicity and economy are realistic features of my invention since I overcome vertical registration problems and yet use considerably fewer circuits and a smaller register than other register machines, for example, a machine like that disclosed in the Rabinow, et al. Patent No. 3,104,369.

By way of example, I use a horizontal row of photocells to extract information from the character image and its background as the character image is moved horizontally at one rate and vertically oscillated at a much higher rate. It is obvious that means other than a horizontal row of photocells can be used for this purpose. However, a horizontal row is advantageous because fewer photocells are required than if the row of photocells were vertical (taking into account that characters are generally taller than they are wide).

With the above arrangement, the short-term temporary storage device of the machine (e.g. a shift register) can be constructed to the exact proportions of the character. For example, if the machine is designed to identify characters of a 5 x 9 font, in theory the register need have no more than 45 units (stages if a magnetic core or flip flop shift register is used). Such a small capacity register is possible owing in part to the method that I use for loading the register. In this regard consider a single oscillatory cycle of motion of a character image over the face of the horizontal row of photocells. Assume that one cycle consists of two vertical excursions of the image, i.e. one downward and the other upward. In one form of my invention I can load the register during one excursion, say the downward excursion. The character-defining data will enter the register, and at one time or another during the excursion the entire character image will be represented therein. If the excursion is long, the data will simply riple out (fully or partially) of the register. The important thing to note, however, is that at some time during the excursion of the image, the image was fully represented in the register.

I have several alternatives during the upward excursion of the single cycle under discussion. At the termination of the downward excursion of the image, I can clear the register and maintain it in a cleared condition until such time that the next cycle commences. Alternatively, I can also load the register during the upward excursion, but this would mean that the character-defining data will be upside-down. This ordinarily will provide no difficulty and, in fact, if one elects (at the expense of additional equipment) an additional inverted set of correlation devices or the equivalent can be connected with the register. Although this can be done, machine cost will be increased and, in a few instances, there may be ambiguities. For example, a "9" may be confused with a "6" in some fonts. In another embodiment of my invention, I load the unknown character-defining data fully in the register during each half-cycle (both the down excursion and the up excursion) and have it always oriented properly. This is accomplished by loading the register in one direction during the vertical down excursion, and loading the register in the opposite direction during the vertical up excursion. This requires very little additional circuitry and doubles the effective resolution (or reading rate) of the reading machine.

Accordingly, a further object of my invention is to provide a reading machine capable of operating substantially as discussed above, for identifying machine-printed and/or hand-printed characters.

In discussing the horizontal motion of the character images and the transverse excursions at a higher rate during the horizontal motion, means for accomplishing these motions were not mentioned. It can be assumed that horizontal motion of the character image can be caused by horizontal movement of the document by a conventional document mover. An equivalent, of course, is to hold the document stationary and horizontally move the scanner to produce the equivalent of horizontal image motion. Vertical motion of the character image can be achieved by any of the several devices (and others) shown in the drawings. The extent of travel (length of excursions) can be made large (covering two or more character heights) for special purposes such as automatic recognition of characters substituted for print errors as disclosed and claimed in the J. Rabinow pending application Serial No. 334,747, filed concurrently.

I mentioned before that I prefer to use a horizontal row of photocells as a scanner. This has been suggested earlier, for instance, U.S. Patent No. 3,088,097 shows such a scanner, and Patent No. 2,682,043 discloses several horizontal rows of photocells. However, the ultimate objectives of my invention are accomplished not merely by use of a horizontal row of photocells as a scanner. I use a horizontal row of photocells (or the equivalent) to examine the character image while it is horizontally moving and undergoing vertical oscillations at a rate higher than the horizontal motion of the character. Also, the examination device of my reading machine, taken alone, is incapable of the economies achieved by my minimum height (and width, if desired) register and yet care for a wide range of vertical registry tolerance. If it were not for the vertical excursions of the character image, it would not be possible to exactly register the data in the shift register for each character.

I wish to mention the superficial resemblance between vertically oscillating a character image and vertically oscillating a scanning spot over an image. In the latter case a register having a capacity corresponding to the full vertical excursion of the spot is required, and there ordinarily must be some way to locate the data in the register. In the former case the capacity of the register in the vertical dimension need be only as great as the height of the character, and no means are required to locate or "find" the data in the register.

Other objects and features will become apparent in following the description of the illustrated embodiments of the invention which are given by way of example only.

FIGURES 1–1*e* inclusive are diagrammatic views showing the relationship of a character image with my scanner and minimum-capacity register during one cycle of sweep motion, i.e. a cycle of vertical image motion including a single down-sweep and a single up-sweep.

FIGURES 2–2*e* inclusive are similar to the above figures except that they show the greater utilization of the scanner and register during the same single cycle of vertical sweep motion of the character image.

PREFACE

Figure 1:
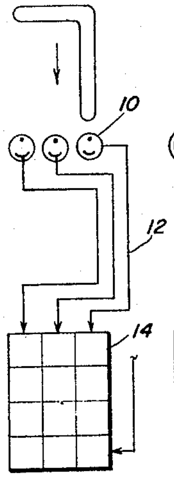
Figure 1A:
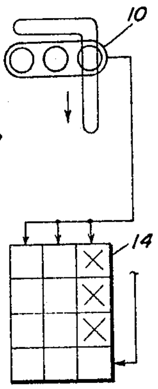
Figure 1B:
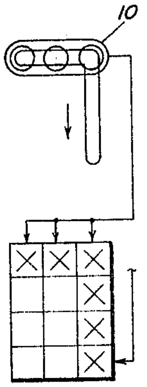
Figure 1C:
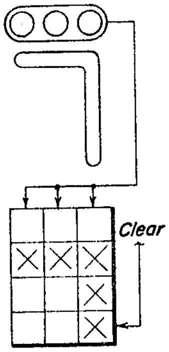
Figure 1D:
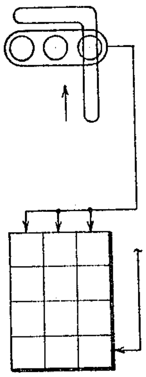
Figure 1E:
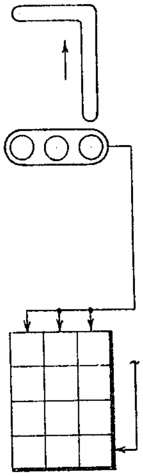
Figure 2:
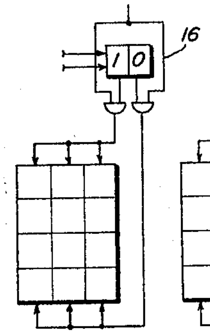
Figure 2A:
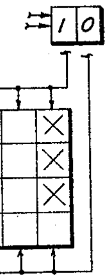
Figure 2B:
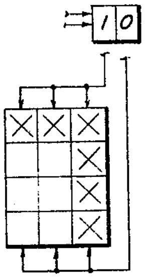
Figure 2C:
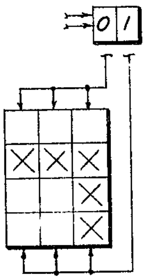
Figure 2D:
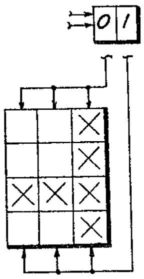
Figure 2E:
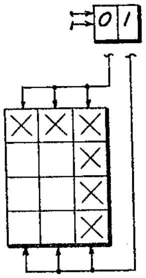

My invention can be better understood by reference to the greatly simplified diagrams of FIGURES 1–2*e* inclusive. These figures illustrate one method of overcoming the familiar vertical registration problem without the necessity of providing additional storage capacity in the register, nor plural, redundant character-criteria, nor the other usual expedients. For the purpose of the figures, it is assumed that the image of the character "7" is moved horizontally at one speed while the same image is swept vertically at a much higher speed. For example, by the time that one character moves horizontally past the scanner it will be made many vertical excursions (e.g. ten to one hundred). To explain my invention, consider one full sweep cycle of a character image to be composed of one vertical downward excursion (from FIGURE 1 to FIGURE 1*c* inclusive) together with one vertical upward excursion (from FIGURE 1*c* to FIGURE 1*e* inclusive). As the first excursion of the character image is underway, assume that the image is slightly above the photosensitive examination device 10 (henceforth called "scanner") made of a horizontal row of photocells, whose separate output lines 12 conduct the character-defining data into the respective vertical columns of shift register 14. As the character image moves downward (FIGURE 1*a*) with respect to scanner 10, the scanner outputs are gated into register 14 in a manner such that the signals representing the lower portion of the vertical feature of the "7" are gated into the righthand column of the shift register. As the character image continues in its downward excursion (FIGURE 1*b*) the full character image will have been examined by scanner 10 and the data extracted therefrom stored in the register. Should the vertical downward excursion of the image be in excess of the character height (as in a practical case) the stored information will simply step downwardly through the register as shown in FIGURE 1*c*. However, this will cause no difficulty in the recognition of the character owing to the method which I use for continually correlating the information in the register with character standards and making an ultimate decision as to the identity of the character on the basis of the highest correlation (or correspondence to preset standards of other kinds) between the information in the register at all of its instantaneous positions and the character standards.

At the end of the downward vertical excursion (FIGURE 1*c*) I have several possible alternatives, each providing certain advantages. As illustrated (FIGURES 1*d* and 1*e*) I can clear the register at the end of the vertical downward excursion and store no additional information in the register during the vertical upward excursion of the character image. This, of course, means that horizontal resolution is decreased assuming that the character image is moved horizontally at a fixed rate while it is being vertically swept. Instead of loss of horizontal resolution, the horizontal motion of the character image can be slowed with a resulting slowing of the useful effective output rate of the reading machine.

Another possibility is to load the register during the vertical downward excursion and clear the register at the end thereof, and then again load the register during the vertical upward excursion of the image. (If desired the clearing step can be omitted.) However, this would mean that the second excursion of each cycle would result in the storing of the image-defining information in a vertically inverted manner. If I wish to take advantage of this, I could use plural sets of character standards, a first set oriented to examine the register with character image information upright as shown in FIGURE 1*b*, while the second set is upside down, i.e. vertically inverted. This alternative suffers from complexity and for some fonts may even lead to ambiguities between pairs of characters (for example, a "6" upside down is a "9"). Even a difficulty such as this can be overcome because I can switch out the inappropriate set of standards during the successive image excursions. But this leads to additional complexity which cannot easily be afforded in a machine whose objective is to be inexpensive.

FIGURES 2–2*e* are to be considered with the scanners and character images shown in FIGURE 1–1*e*. FIGRES 2–2*e* show how to overcome the problem of half-cycle losses described above by a very simple logic switching circuit 16 (described fully in the detailed description to follow). I can load the register by stepping the information vertically downward during the vertical down sweep of the image (FIGURES 2–2*c*) and load the same register from the bottom (vertically upward) during the vertical upward sweep of the character image (FIGURES 2*d* and 2*e*). As in FIGURES 1–1*e*, if I wish to clear the register at the end of the vertical downward excursion (FIGURE 2*c*) I can easily do so. It is stressed that the means for accomplishing the sequential bi-directional loading of the register (FIGURES 2–2*e*) are simple and inexpensive.

Although I have discussed and will continue to discuss upward and downward vertical excursions of the character image because this type of operation more clearly permits an understanding of my invention, it is obvious that the excursions may be in one direction only. Further, the height of each excursion has not been specifically discussed, except to mention that it must obviously be greater than the height of the character image. If the excursion height is greatly increased and I follow, at least in principle, the disclosure in may concurrently filed application entitled Reading Machine with Automatic Recognition of Characters Substituted for Print Errors, my present reading machine can accomplish at least some of the objectives disclosed therein.

Finally, the storage capacity of my register need only be that necessary to store the vertical height of the unknown character, and this is an important economic advantage. Yet, in a practical machine, even with the benefits of my invention, the register can have additional vertical storage for many reasons. For instance, in an alpha-numeric reading machine I will obviously use the same register during the identification of "*e*" and "H." The register must be sufficient for at least momentarily storing the full height of the "H," and will obviously be greater than that required for the "*e*," in the absence of optical or electronic size-normalizing which is not pertient herein.

DETAILED DESCRIPTION

Figure 3:
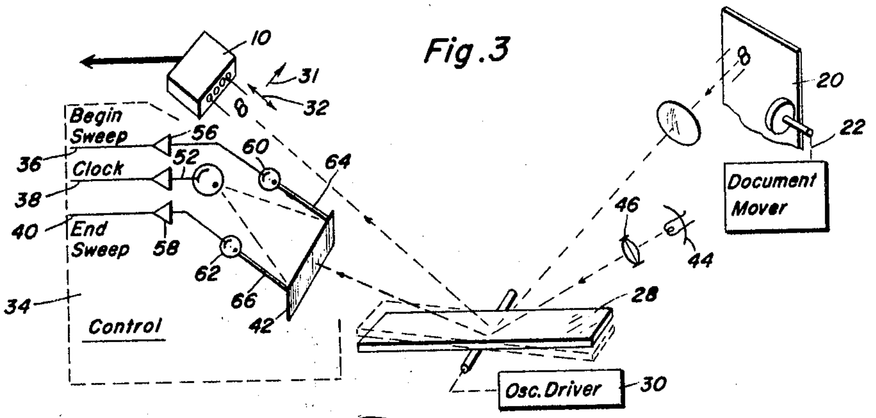
FIGURE 3 is a largely schematic view showing one embodiment of the control section of my machine and one means for vertically sweeping the character image as it is horizontally moved.
Figures 4, 5:
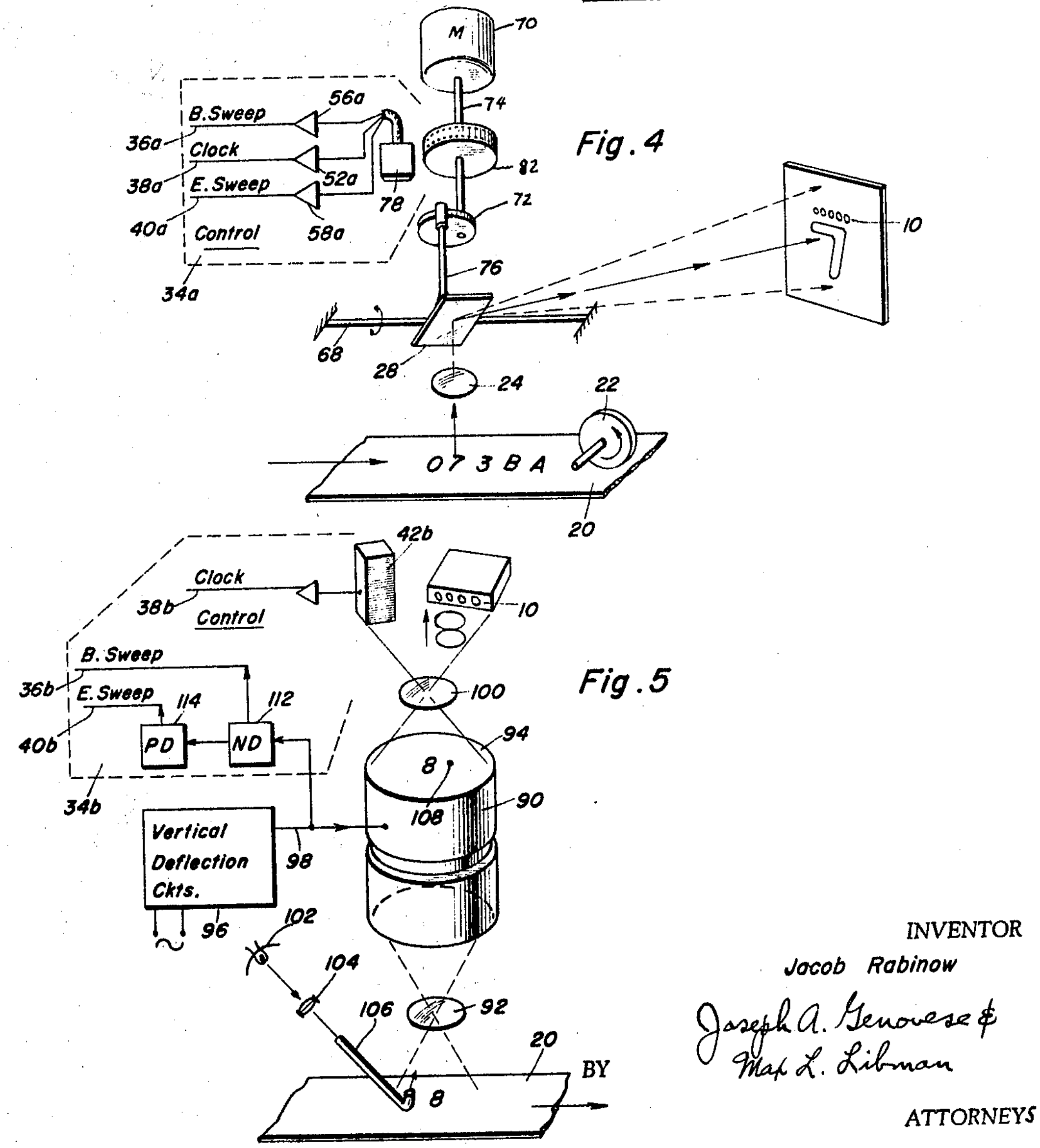
FIGURE 4 is a largely schematic view showing another embodiment of the control circuits and image sweeping means of FIGURE 3.
FIGURE 5 is a schematic view showing a still further embodiment of the control circuit and image-sweeping means.
Figures 6, 7:
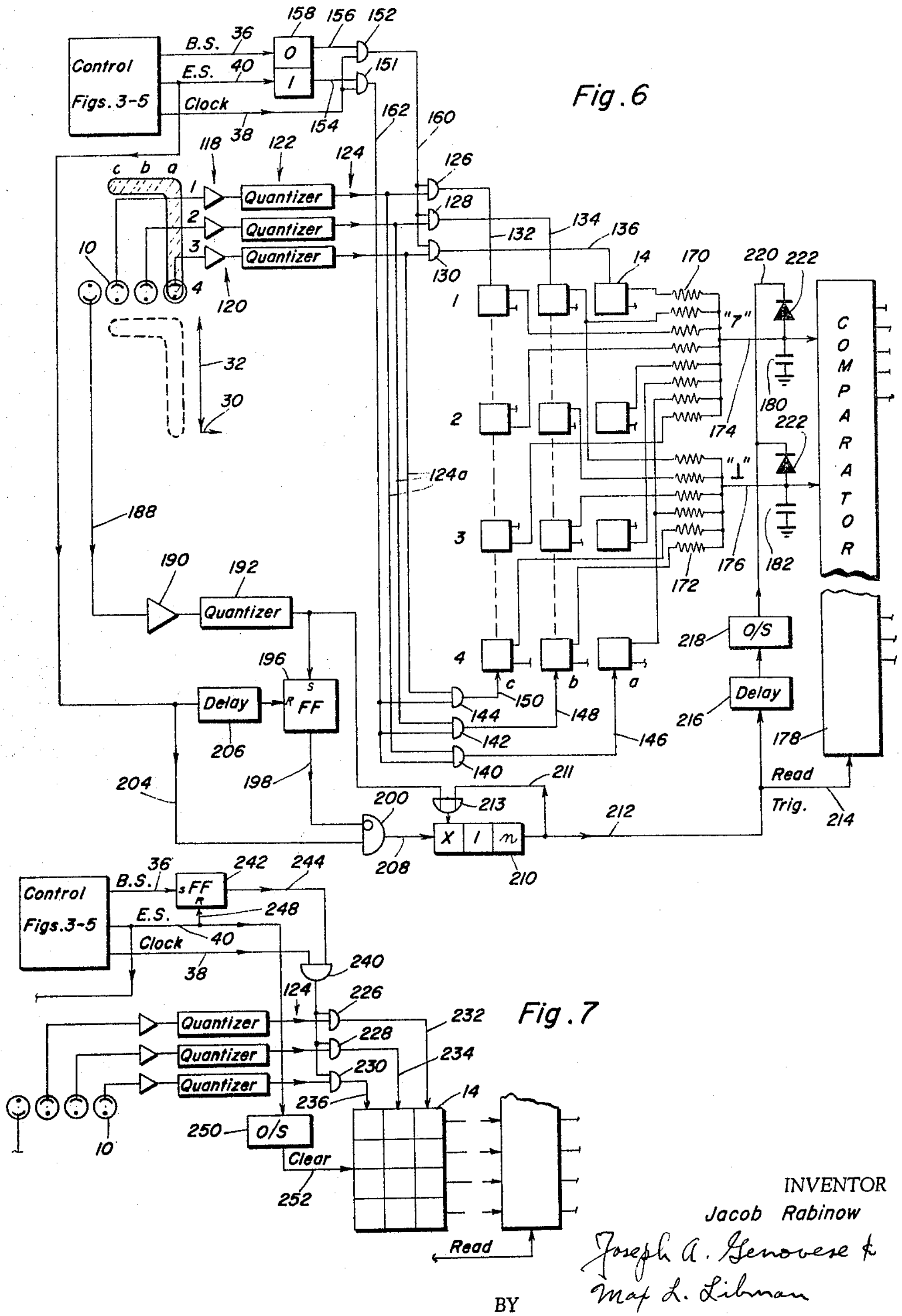
FIGURE 6 is a fragmentary schematic view of my reading machine designed to operate in the manner disclosed schematically in FIGURES 2–2*e*.
FIGURE 7 is a view similar to FIGURE 6 and showing a slight simplification of the machine which enables my reading machine to operate in the manner shown in FIGURES 1–1*e* inclusive.

FIGURES 3–5 show only three of numerous methods of providing the above described components of image motion. These figures also disclose three ways to provide basic control signals that are used in my machine. FIGURES 6 and 7 show how the control signals are used.

Considering first FIGURE 3, document 20 is shown being moved in one direction by means of a conventional document mover 22. An image of an unknown character ("8" in the illustration) is formed by optical system 24, and reflected by an oscillating mirror 28 onto the face of the photocells of scanner 10. Mirror 28 is oscillated by a conventional driver 30, and the mirror, its mount, and the driver 30 can constitute a resonant system. The motion of the document 20 causes the image of the character to move in direction 31 (termed "horizontal" herein), while the oscillations of mirror 28 cause the sweep excursions shown by arrow 32 (termed "vertical" herein).

The control section 34 in FIGURE 3 is responsible for three separate signals on lines 36, 38 and 40 respectively. These lines are termed "begin sweep," "clock" and "end sweep" for the signals which they conduct. The signals are used in the manner described fully in connection with the description of FIGURES 6 and 7.

To assure that the signals on lines 36, 38 and 40 are always in synchronism with the excursions of the character image with respect to scanner 10, I have an optical grating 42 with alternate opaque and transparent lines, mounted in a place to intercept a spot of light reflected by mirror 28, originating from light source 44 and focused by optical system 46. Photocell 50, for instance a photomultiplier, is optically aligned with the gating 42 to respond to the spot of light transconducted through the grating as the spot sweeps across the grating lines in synchronism with the oscillations of mirror 28. Line 52 from the photocell is connected with amplifier 54 whose output line 38 is the clock pulse signal conductor.

The "begin sweep" and "end sweep" lines 36 and 40 are the output lines of amplifiers 56 and 58 whose input lines are operatively connected with photocells 60 and 62. Light pipes 64 and 66 (or the equivalent) are aligned with the two photocells 60 and 62, and the upper and lower parts of grating 42. Thus, when the spot of light reaches the top of the grating, the "begin sweep" signal is given on line 36. When the spot of light reaches the bottom of the grating, an "end sweep" signal is given on line 40.

FIGURE 4 discloses a system which is the functional equivalent of that of FIGURE 3. Document 20 is moved in one direction by the conventional document mover 22 to provide horizontal component of motion for the images of the unknown characters. An optical system represented by lens 24 forms an image of the unknown character on the face of scanner 10 by way of oscillatory mirror 28. As in FIGURE 3, mirror oscillations cause the vertical excursions of the image with respect to the horizontal row of photocells forming scanner 10, while motion of the document provides the horizontal component of scan motion. Motor 70 is used to drive cam 72 which is attached to motor shaft 74, and arm 76 secured to mirror 28 has a cam follower in contact with the surface of the cam. Thus, as the motor 70 rotates cam 72, mirror 28 is correspondingly oscillated on (or with) its mount 68 in accordance with the shape of the cam.

The control section **34*a* includes means to provide "begin sweep," "clock pulse" and "end sweep" signals on lines 36*a*, 38*a* and 40*a* respectively. These lines are the output conductors of amplifiers 56*a*, 52*a*, and 58*a* respectively on which signals are impressed by means of magnetic pick-up head (or heads) 78. The heads are mounted adjacent to (or in contact with) the surface of a drum 82 having prerecorded clock, sweep (and/or other) signals thereon. The drum is attached to shaft 74 so that it must rotate in synchronism with arm 76, and hence the vertical sweeping of the character image with respect to the scanner 10. Obviously, a fully or partially optical system can be substituted for the magnetic system shown in FIGURE 4. For example, magnetic drum 82 can be replaced by an optical disc (or drum), while magnetic head 78** (or heads) are replaced by optical pick-up devices.

Attention is now directed to FIGURE 5, disclosing another system for vertically sweeping the image of the unknown character while it is horizontally moved. In this view, document 20 is moved horizontally by means of the conventional document mover (not shown), while an image of a character thereon is formed on the receiving surface of an image converter tube 90 by means of an optical system represented by lens 92. When an image falls upon the photocathode receiving surface of an image converter tube, an electronic lens (a part of the tube) forms a corresponding image on the phosphor screen 94. Although image converter tubes have several capabilities, for the purpose of my invention the vertical deflection of the image on the screen 94 is my primary interest. Accordingly, I have shown a conventional vertical deflection circuit 96 operatively connected with tube 90 by way of line 98. Thus, as the image of the character is swept horizontaly across the screen of tube 94 (due to document motion), the image is vertically swept at a much higher rate by the tube to cause the image projected by lens 100 on the scanner 10 to be vertically oscillated. In this (and the other) form of my invention the excursions can be either bidirectional (shown) or unidirectional (e.g. by blanking one excursion of each cycle).

Since tube 90 is used in the system of FIGURE 5 for the vertical excursions of the character image, I can use this tube to sweep a spot of light across the face of a grating **42*b* similar to the grating 42 in FIGURE 3 to serve the same purpose as that grating. The spot of light is formed by light source 102 (lower part of FIGURE 5), a lens 104 and a light pipe 106, shaped and directed in the manner shown. Thus, the bright spot at the emitting surface of the light pipe will appear at 108 on the screen 94 of tube 90 and will be projected by lens 100 onto the grating 42*b***.

The control section **34*b* is like control sections 34 and 34*a* to the extent that I have three lines 36*b*, 38*b* and 40*b* which conduct "begin sweep," "clock" and "end sweep" signals at the proper times. The clock signals on line 38*b* originate from a photocell (not shown) behind grating 42*b* and an amplifier. The "begin" and "end" sweep signals on lines 36*b* and 40*b* are obtained by connecting line 110 to the vertical deflection signal line 98 and using negative and positive differentiators 112 and 114 respectively to provide begin and end sweep signals when the voltage of the deflection signals on line 98** changes direction.

Attention is now directed to FIGURE 6, which fragmentarily shows a reading machine circuit in accordance with my invention. The scanner 10 is composed of three photocells having separate output lines connected with amplifiers 118 whose output lines 120 are connected with quantizers 122. As shown by the column legends *a, b,* and *c*, and the row legends 1–4 the simplified version of my machine is designed (as illustrated) to identify 3 x 4 font characters. It is understood in this art that greater resolution is ordinarily required but the simplified showing is preferred since it illustrates the principle involved and leads to simplicity of illustration.

Each quantizer 122 has an output line, shown as group 124, and each of the lines 124 forms an input conductor for one of the And gates 126, 128 and 130. The output lines 132, 134 and 136 of the three And gates form input signal conductors which operate in parallel to load information into the register 14 composed of three columns *a, b*, and *c* and four rows 1–4.

Since the reading machine in FIGURE 6 is designed to operate as shown in FIGURES 2–2*e*, a second set of And gates 140, 142 and 144 is used to load register 14 from the bottom during the vertical upward excursion of the character image with respect to scanner 10. The output conductors 146, 148 and 150 from the And gates 140, 142 and 144 are operatively connected with the lower input terminals of shift register 14. Lines **124*a*, which are respectively connected to the lines 124, form a respective input conductor for the three And gates 140, 142 and 144. Accordingly, with an exceedingly simple logic circuit used in conjunction with the control circuit of FIGURE 3 or FIGURE 4 or FIGURE 5, the scanner-extracted information is gated into the top of register 14 by gates 126, 128 and 130 during the downward excursion of the character image, and gated upwardly by lines 124*a*, and gates 140–144 into the bottom of the register 14 during the upward excursion of the image across scanner 10**.

The control circuit represented at the upper left corner of FIGURE 6 has the previously described "begin sweep," "end sweep" and clock signal conductors 36, 40 and 38 respectively extending therefrom. The clock signals on line 38 form concurrent inputs to a pair of gates 151 and 152 while the other respective input to each of these gates is conducted on flip flop output lines 154 and 156. Flip flop 158 is a binary flip flop which is operated by the respective "begin sweep" and "end sweep" signals on lines 36 and 40. Thus, one or the other of the two And gates 151 and 152 passes the clock pulses on line 38, and these clock pulses are conducted on lines 160 and 162, depending on which of the two gates 151 or 152 passes the clock signals. Line 160 is connected as an input to And gates 126–130, and line 162 is connected to form clock signal input conductors for the gates 140–144.

Character standards or criteria are established by using at least one correlation device for each unkown character that the machine is expected to identify. To simplify the disclosure, I have illustrated only one type of correlation device, although others may obviously be used. Correlation devices 170 and 172 for the characters "7" and "1" are shown connected with register 14 in the proper manner for idenification of these characters. The correlation devices are resistor adders, constructed along the lines fully described in U.S. Patent No. 3,104,269, and they make use of the assertion, negation and weighting techniques mentioned therein. Thus, the resistor adder 170 has its resistors connected to the assertion terminals ("black" seeking) of register points **1*c*, 1*b*, 1*a*, 2*a*, 3*a*, and 4*a*. The negation resistors are shown connected to the negation terminal at register points 2*c* and 3*c* to help distinguish the "7" from a "9." In like manner, the resistor adder 172 is constructed as a character standard or criterion for the numeral "1" by connection of the resistors with selected assertion (as illustrated) register points and other negation points (not shown). The output lines 174 and 176 of the resistor adders are connected with comparator 178 which makes the decision as to the identity of the scanned character on the basis of the signals conducted on lines 174, 176** and the other lines (not shown) for the other characters that the machine is expeced to identify.

In any reading machine, where the comparator or other decision-making means depends upon real time for triggering the decision functioning, it is not simple nor obvious how the objectives of my invention can be fulfilled. In other words, if the signals conducted on lines 174, 176, etc. must be examined at a specific time (for instance, when the character-defining data is shifted to a specific position in the register, as in one of the embodiments disclosed in U.S. Patent No. 3,104,369) the major objectives of my invention could not easily be accomplished. To overcome this problem, I have storage capacitors 180, 182 (and others not shown) to store the optimum signal occuring on each of the lines 174, 176 (and the others not shown). The term "optimum" applies whether the "optimum" is the highest positive, most negative, nearest to a reference, etc. This is a matter of circuit design. By using storage capacitors in this way it does not matter if the vertical excursions are such that parts of characters above and/or below the character being read momentarily enter and leave the register. Also I do not rely on the position of the information in the register to provide a "read" trigger signal for the comparator 178. Instead I can use numerous other means, one of which is shown in FIGURE 6 and described below.

Photocell 186 is used to detect the clear white space following a character (usually between adjacent characters) to ultimately provide a read trigger signal for the comparator 178. It is understood that separate photocell 186 is illustrated for this purpose only as a matter of convenience. Indeed, it would be just as easy to use photocells "*c*" of the scanner for this purpose.

The output line 188 from photocell 186 is connected to amplifier 190. The output conductor of the amplifier is connected to quantizer 192, and the quantizer output line 194 is operatively connected to flip flop 196. Accordingly, whenever photocell 186 detects "black" (a portion of the character image) flip flop 196 is set thereby providing a signal on its output line 198. Line 198 is connected with the inhibit terminal of inhibit gate 200 which is mentioned again later. The "end of sweep" signal on line 40 is conducted to inhibit gate 100 by way of lines 202 and 204. Flip flop 196 is reset by the "end of sweep" signal on line 202 through a delay 206. Accordingly, if at the end of a sweep of the image of an unknown character over scanner 10, photocell 186 has detected a portion of the character image anywhere during the sweep, the end of sweep signal cannot pass gate 200 because that gate is inhibited by the output of flip flop 196. Conversely, if at the end of a sweep, no part of the character image has been detected by photocell 186, flip flop 196 will not have been set thereby allowing the end of sweep signal to be conducted through gate 200 via lines 202 and 204. The output signal on line 208 from gate 200 is a provisional read trigger signal and made so to fulfill a requirement that there be at least two sweeps of the image of the character across scanner 10 with photocell 186 failing to detect a part of the character image before it is definitely decided that the space following a character has truly been detected. A simple circuit for achieving this is shown at the bottom of FIGURE 6. It consists of ring counter 210, which steps each time that there is a signal on line 208. With the ring counter composed of *n* stages, *n* signals on line 208 are required before there is an output from the counter on line 212 which is conducted to the comparator as a read trigger signal on line 214. The read trigger signal is fed back over line 211 through Or gate 213 to reset the ring counter 210. Ring counter 210 is also reset anytime that photocell 186 experiences a part of a character image during a sweep, by means of a "black" signal conducted from quantizer 192 to Or gate 213 via lines 194 and 195. This is to care for the possibility that there is a vertical break in a character and photocell 186 experiences "white" for a sweep through the break. During the next sweep photocell 186 will detect the character alongside of the break, and this will result in resetting the ring counter as described above.

When the trigger signal is conducted to the comparator, capacitors 180 and 182 are restored to an initial condition, e.g. discharged, or charged heavily in a predetermined sense. For this purpose there is a delay 216 in line 212 ahead of one shot multivibrator 218 whose output line 220 is connected with lines 174 and 176 through unidirectional devices (for instance diodes 222).

FIGURE 7 is a fragmentary view of a reading machine which can be identical to the reading machine shown in FIGURE 6, except for minor changes in the circuit which will permit my machine to operate as shown in FIGURES 1–1*e* instead of FIGURES 2–2*e*. Starting with the quantizer output conductors 124, these are connected as single, respective inputs to And gates 226, 228 and 230. The output lines 232, 234 and 236 of the gates 226–230 are connected to the top of register 14 to load the register from the top downwardly during the vertical downward excursion of the character image over scanner 10. Since the mode of operation shown in FIGURES 1–1*e* requires the loading of register 14 in one direction only, only one And gate 240 (in place of the two And gates 151 and 152 of FIGURE 6) is required. The clock signals on line 38 are conducted as input signals to And gate 240 and this gate is connected with the "begin sweep" signal conductor in a manner such that it is open to pass the clock pulses only during the vertical downward excursion of the character image across scanner 10. Specifically, the "begin sweep" signal on line 36 is connected to flip flop 242 and the output line 244 of the flip flop forms an input to the And gate 240 (the other input being the clock signal line 38). The "end of sweep" signal on line 40, is conducted via line 248 to the reset terminal or flip flop 242. Thus, the flip flop 242 provides an output signal on line 244 only during the time that the image is sweeping vertically downward in a vertical downward excursion.

As indicated in the description of FIGURES 1–1*e*, I can clear the register at the end of each vertical downward (or upward) excursion of the character image. It is a simple matter to use the "end of sweep" signal on line 40 to trigger the one shot multivibrator 250 (or pulse burst generator) whose output signal on clear line 252 resets the register to a predetermined (clear) condition. Of course, if time constants of the components in the entire system indicate that a delay is required ahead of one shot multivibrator 250, a delay will be used.

Although I have shown and described a number of alterations, modifications, etc. of my invention, it is understood that numerous other changes may be made without departing from the protection of the following claims.

I claim:

1. In an optical character reading machine for characters on an area, a character examination means to provide information signals, means for imaging a said character on said examination means, means to cause relative motion in a horizontal direction between the image and said examination means, and means to vertically sweep the image so that said examination means experiences a plurality of vertical excursions of the image, means providing a control signal in conjunction with a said excursion, a temporary storage register of a capacity not substantially greater vertically than that required to store information signals corresponding to the vertical height of the character, means responsive to said control signal to gate said information signals into said register at least during a fraction of said excursions of the image, and decision means operatively associated with said register to identify the character on the basis of the information which is in said register during at least one of said excursions.

2. The subject matter of claim 1 wherein said register is vertically bidirectional, and said sweeping means vertically move the image in cycles where each cycle consists of a vertically upward excursion and a vertically downward excursion, and said gating means gate said signals into one end of said register in one vertical direction during the first excursion of a cycle, and said gating means gate said signals into the opposite end of said register in the opposite vertical direction during the second excursion of the cycle so that said decision means experience the stored signals pertaining to the full character in the same orientation twice during each of said cycles.

3. The subject matter of claim 1 wherein said vertical motion sweeping means require said image to oscillate cyclically with each cycle including a pair of said excursions, and means to clear said register between the excursions of said pair.

4. In a reading machine for characters on an area, means including a horizontal row of photocells to examine each of the characters in turn, means for imaging the characters in turn on said photocells, means for causing relative movement in a first direction between one of the images and said photocells, means for oscillating the image in excursions transverse to said first direction and at a higher rate than the first-mentioned movement so that the character area image is swept past the photocells a plurality of times, means providing clock signals in coordination with said excursions, means responsive to the outputs of said photocells to provide information signals corresponding to the character image being examined during said excursions, a temporary storage, means responsive to said clock signals for conducting, in parallel, said signals originating from the photocells of said row into said storage during each transverse image excursion caused by said oscillating means, means forming character standards operatively connected with said temporary storage and providing electrical outputs continually as said signals are conducted into said temporary storage, a memory means for each character for which there is a said character standard, said memory means storing the optimum of said electrical outputs pertaining to each character standard, and character-identity means responsive to the stored electrical outputs to identify the examined character.

5. The reading machine of claim 4 wherein said temporary storage has a capacity not substantially vertically greater than that required to store information signals corresponding to the tallest character to be identified, and registration tolerance is provided in a direction parallel to said excursions owing to the continuous loading of said storage with said information signals as the character area and tolerance areas are examined during which said optimum electrical outputs are committed to said memory means.

6. The reading machine of claim 4 and control means responsive to the actuation of said image oscillating means, for providing control sgnals, and means responsive to said control signals for committing said information signals to said temporary storage in time with said clock signals.

7. The reading machine of claim 6 wherein said character identity means are trigger responsive, and means under the control of said control means for providing a trigger signal for said character identity means.

8. In a reading machine for characters; means for forming a horizontally moving image of a character to be identified; a photosensitive scanner; means for vertically sweeping said image over said scanner repetitively at a greater rate of speed than the horizontal motion of said image; said scanner including a horizontal row of photocells across which said image is vertically swept; amplifiers for the information output signals of said photocells; storage means for said output signals; means responsive to said image sweeping means for providing clock signals at a rate which corresponds to the rate of vertical movement of said image so that the clock signal frequency will vary to correspond to any possible variation in vertical sweep rate of the image; means responsive to said clock signals for conducting said information signals into said storage means as said image is vertically swept across said photocells; control means operative with said vertical sweeping means to provide a control signal; and means responsive to said control signal for controlling said conducting means.

9. In an optical character reading machine having means to form a horizontally moving image of a character to be identified; a scanner across which said image is adapted to move during its horizontal movement; said scanner having photoresponsive means for providing information signals; means optically aligned with said scanner for vertically sweeping said image over said scanner at a higher speed than the horizontal component of image motion, the vertical excursions of the image caused by said image sweeping means being sufficiently long to assure that the character image is fully vertically registered with said scanner during a portion of a vertical sweep; and control means operable as said sweeping means vertically move the image, for providing a control signal which signifies an instantaneous vertical position of the image; and processor means for said information signals, controlled by said control signal.

References Cited by the Examiner

UNITED STATES PATENTS

| | | | |
|---|---|---|---|
| 2,978,675 | 4/1961 | Highleyman | 340—146.3 |
| 3,213,422 | 10/1965 | Fritze et al. | 340—146.3 |

MAYNARD R. WILBUR, *Primary Examiner.*

MALCOLM A. MORRISON, *Examiner.*

J. S. IANDIORIO, J. E. SMITH, *Assistant Examiners.*